(12) United States Patent
Myers et al.

(10) Patent No.: US 8,384,232 B2
(45) Date of Patent: Feb. 26, 2013

(54) GENERATING ENERGY FROM FLUID EXPANSION

(75) Inventors: Scott R. Myers, Spring Hill, FL (US); David J. Huber, Tequesta, FL (US); Lawrence A. Hawkins, Redondo Beach, CA (US)

(73) Assignee: Calnetix Technologies, L.L.C., Yorba Linda, CA (US)

( * ) Notice: Subject to any disclaimer, the term of this patent is extended or adjusted under 35 U.S.C. 154(b) by 324 days.

(21) Appl. No.: 12/839,257

(22) Filed: Jul. 19, 2010

(65) Prior Publication Data
US 2012/0013125 A1     Jan. 19, 2012

(51) Int. Cl.
*F01D 15/00* (2006.01)
*H02K 7/18* (2006.01)
*H02P 9/04* (2006.01)

(52) U.S. Cl. ........................................................ 290/52

(58) Field of Classification Search ............. 290/52, 290/54, 43; 310/90.5, 90
See application file for complete search history.

(56) References Cited

U.S. PATENT DOCUMENTS

| | | | |
|---|---|---|---|
| 5,924,847 A * | 7/1999 | Scaringe et al. | 417/42 |
| 6,727,617 B2 | 4/2004 | McMullen et al. | |
| 2008/0252077 A1 * | 10/2008 | Myers | 290/52 |
| 2010/0301840 A1 * | 12/2010 | Filatov | 324/207.11 |
| 2011/0289922 A1 * | 12/2011 | Myers et al. | 60/651 |

OTHER PUBLICATIONS

Maghon, Hans, et al., "*50-Hz Healy Duty Gas Turbines—Experience and Evolution*," Siemens Power Generation (PG), 2005, 10 pages.
U.S. Appl. No. 12/475,052, filed May 29, 2009, Filatov.
U.S. Appl. No. 12/790,616, filed May 28, 2010, Myers et al.

* cited by examiner

*Primary Examiner* — Javaid Nasri
(74) *Attorney, Agent, or Firm* — Fish & Richardson P.C.

(57) ABSTRACT

An apparatus includes an electric generator having a stator and a rotor. A turbine is coupled to an end of the rotor to rotate at the same speed as the rotor. The turbine may rotate in response to expansion of a working fluid flowing from an inlet side to an outlet side of the turbine. The apparatus also includes a housing assembly with an inwardly oriented shroud, which is located at close proximity to the turbine. The proximity of the shroud to the turbine establishes the pressure ratio of the turbine, allowing the system to operate without seals. Magnetic bearings and position sensors are used to maintain the distance between the shroud and the wheel. In certain implementations, the positioning of the turbine can be controlled to optimize machine performance.

22 Claims, 9 Drawing Sheets

GENERATING ENERGY FROM FLUID EXPANSION

TECHNICAL FIELD

This document relates to a fluid expansion system, including some systems that comprise a seal-less turbine apparatus to generate energy from fluid expansion.

BACKGROUND

A number of industrial processes create heat as a byproduct. In some circumstances, this heat energy is considered "waste" heat that is dissipated to the environment. Exhausting or otherwise dissipating this "waste" heat generally hinders the recovery of this heat energy for conversion into other useful forms of energy, such as electrical energy.

SUMMARY

In some embodiments, an electric generator apparatus includes a rotational assembly and a stationary assembly, the stationary assembly stationary relative to the rotational assembly when the rotational assembly is rotating. The rotational assembly includes a turbine wheel configured to receive a working fluid and rotate in response to expansion of the working fluid flowing into an inlet of the turbine wheel and out of an outlet of the turbine wheel. The rotational assembly also may include a rotor of an electric generator, the rotor coupled to the turbine wheel to rotate at the same speed as the turbine wheel when the turbine wheel rotates. In embodiments, the stationary assembly includes a stator of the electric generator and a housing assembly. The housing assembly may include a working fluid inlet and a working fluid outlet, the turbine and the stator residing in the housing assembly between the working fluid inlet and the working fluid outlet. The housing assembly may define a shroud surface adjacent the turbine wheel. The electric generator apparatus may also include a plurality of bearings operable to support the rotor and turbine wheel to rotate relative to the stator. The bearings may reside in the housing assembly between the working fluid inlet and the working fluid outlet. The rotational assembly may be configured to have no seals between the working fluid inlet and the working fluid outlet.

In some embodiments, a system may include a turbine generator apparatus. The turbine generator apparatus may include a rotating assembly and a stationary assembly, the stationary assembly stationary relative to the rotating assembly. The rotating assembly may include a turbine wheel configured to receive a working fluid and rotate in response to expansion of the working fluid flowing into an inlet of the turbine wheel and out of an outlet of the turbine wheel. The rotating assembly may also include a rotor of an electric generator that may be coupled to the turbine wheel to rotate at the same speed as the turbine wheel when the turbine wheel rotates. The stationary assembly may include a stator of the electric generator and a housing assembly. The housing assembly may include a working fluid inlet and a working fluid outlet. The turbine and the stator may reside in the housing assembly between the working fluid inlet and the working fluid outlet, the housing assembly defining a shroud surface adjacent the turbine wheel. A plurality of bearings are operable to support the rotor and turbine wheel to rotate relative to the stator, and the plurality of bearings may reside in the housing assembly between the working fluid inlet and the working fluid outlet. The rotating assembly may be configured having no seals between the working fluid inlet and the working fluid outlet. A controller may be coupled to the plurality of bearings and configured to control a position of the turbine wheel relative to the shroud surface.

In some embodiments, a method may include directing a heated and pressurized working fluid to an inlet of a housing of the turbine generator apparatus. The working fluid may be directed to flow through a turbine wheel of the turbine generator apparatus from an inlet of the turbine wheel to an outlet of the turbine wheel. The turbine wheel may rotate in response to the flow of the working fluid from the radial inlet to the axial outlet of the turbine wheel. Position information may be received from a position sensor, the position information providing a distance separating the turbine wheel from a shroud surface on the housing. The position information may be processed to determine a distance separating the turbine wheel from the housing. Instructions to one or more magnetic bearings may be provided based on the position information. The magnetic bearings providing support to the turbine wheel to rotate relative to the shroud and at a distance from the shroud to substantially seal the working fluid as it flows through the turbine wheel.

In certain instances, the plurality of bearings comprises a plurality of magnetic bearings operable to radially support the rotor and turbine wheel to rotate relative to the stator.

In certain instances of the embodiments, the turbine wheel includes a plurality of blades, each blade having a blade tip spanning between the inlet and the outlet of the turbine wheel. The housing assembly may include an inwardly facing shroud surface, and the blade tips may reside at a position adjacent the inwardly facing shroud surface and substantially seal against passage of working fluid between the blade tips and the shroud during rotation of the turbine wheel at certain operating conditions.

In certain instances of the embodiments, the plurality of bearings comprises an axial magnetic bearing actuable to control the axial position of the turbine wheel relative to the inwardly facing shroud. In some instances, an axial position sensor may be configured to sense the axial position of the turbine wheel relative to the housing assembly. A controller may be coupled to the axial position sensor and the axial magnetic bearing and may be configured to control the position of the turbine wheel relative to the shroud surface based on data from the axial position sensor.

In certain instances of the embodiments, the controller is operable to receive one or more system performance metrics pertaining to operational performance of one or more system processes. The controller may process the one or more performance metrics to determine an overall performance of the system. The position of the turbine relative to the shroud surface may be adjusted based on a comparison of the determined performance to a predetermined target performance.

In certain instances of the embodiments, the controller is operable to control the position of the turbine relative to the shroud surface based on system performance metrics to achieve maximum efficiency of the system.

In certain instances of the embodiments, the shroud surface is softer than the blade tips.

In certain instances of the embodiments, the inlet to the turbine wheel is a radial inlet and the outlet from the turbine wheel is an axial outlet.

In certain instances of the embodiments, the turbine wheel is coupled to a rotor configured to rotate at the same speed as the turbine wheel.

DETAILED DESCRIPTION

A turbine generator apparatus generates electrical energy from rotational kinetic energy derived from expansion of a gas through a turbine wheel. For example, rotation of the turbine wheel can be used to rotate a magnetic rotor within a stator, which then generates electrical energy. The generator resides on the outlet side of the turbine wheel. The turbine wheel and the rotor reside in a housing. Specifically, the turbine wheel blades reside proximate to a shroud, such as an abradable shroud, on the housing. The position of the turbine wheel may be determined and controlled to operate at a distance from the shroud so as to seal the working fluid as it passes through the turbine. One or more bearings, such as magnetic bearings, can be used to control the turbine wheel position. In addition, the turbine wheel position can be controlled to optimize machine, cycle, or system parameters.

Figure 1:
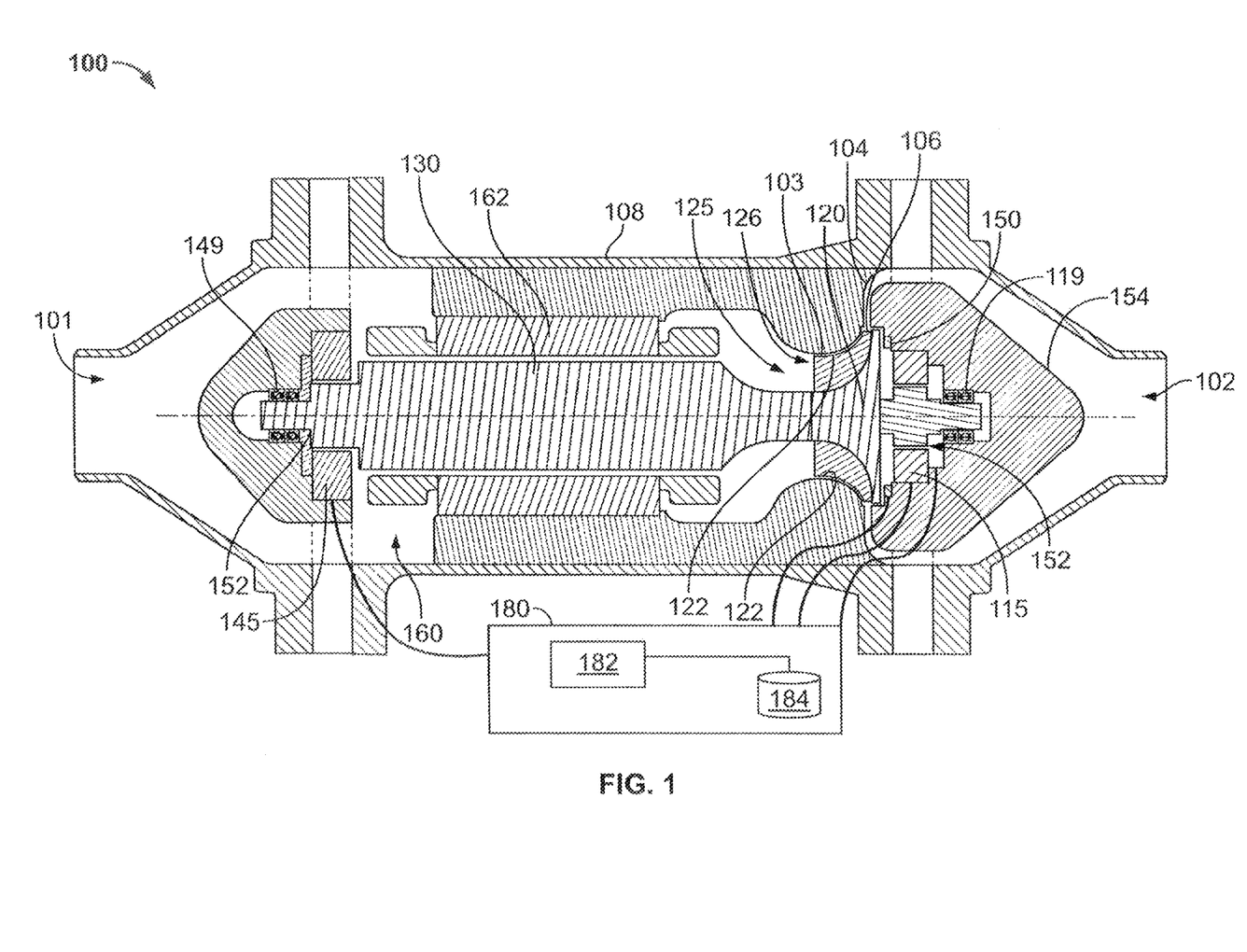
FIG. 1 is a cross-sectional view of a turbine generator apparatus in accordance with the present disclosure.

Referring to FIG. 1, an electric power generation system may comprise a turbine generator apparatus 100 in which electricity is generated from expansion of a working fluid. The turbine generator apparatus 100 can be part of a system in which a pressurized working fluid is permitted to expand and release energy in the turbine generator apparatus 100. The turbine generator apparatus 100 of FIG. 1 includes a hermetically sealed housing assembly 108 that contains a turbine expander (e.g., turbine wheel 120) and a generator 160 coupled to the turbine expander. The turbine wheel 120 rotates upon expansion of the working fluid flowing from its inlet side to its outlet side, and thus operates the generator 160 to generate electricity. For example, the heated and pressurized working fluid may enter the turbine generator apparatus 100 through an inlet 102 of housing assembly 108, expand through the turbine wheel 120, and after expanding, exit the turbine generator apparatus 100 through an outlet 101 of the housing assembly 108.

The turbine wheel 120 is shown as a radial inflow turbine wheel. Working fluid from an inlet conduit 104 of the housing assembly 108 enters a radially oriented inlet 106 of the turbine wheel 120. In certain embodiments, the fluid flows through an inlet conduit 102 and is diverted by a flow diverter 154 to the radial conduit 104. After expanding, the working fluid exits the turbine wheel 120 from an axially oriented outlet 126 to outlet conduit 125 of the housing assembly 108. The turbine wheel 120 includes a plurality of turbine blades 122 extending outwardly from a hub and that react with the expanding working fluid to cause the turbine wheel 120 to rotate. In certain instances, the turbine wheel 120 is a shrouded turbine wheel. FIG. 1 shows an unshrouded wheel, in which each of the blades has an exposed, generally radially oriented blade tip 122 extending between the radial inlet 106 and axial outlet 126. As discussed in more detail below, the blade tips 122 substantially seal against the interior of the turbine housing assembly 108. In certain instances, the radial inflow turbine wheel 120 may be supported by one or more struts rigidly affixed to the turbine generator housing 103.

The turbine generator apparatus 100 of FIG. 1 shows the outlet 126 configured to direct the working fluid from the rotor 130 toward the generator 160, with the radial inlet 106 residing on the opposite end of the wheel 120 from the generator 160. In some embodiments, the working fluid (or some part of the working fluid) is directed from the outlet of the turbine wheel 120 into the generator 160. The working fluid may pass through the generator 160. The working fluid may cool the generator or parts of the generator, such as the rotor and/or the stator.

In certain instances, the turbine wheel 120 is directly affixed to the rotor 130, or to an intermediate common shaft, for example, by fasteners, rigid drive shaft, welding, or other manner. For example, the turbine wheel 120 may be received over an end of the rotor 130, and held to the rotor 130 with a shaft. The shaft threads into the rotor 130 at one end, and at the other, captures the turbine wheel 120 between the end of rotor 130 and a nut threadingly received on the shaft. The turbine wheel 120 and rotor 130 are coupled without a gearbox and rotate at the same speed. In other instances, the turbine wheel 120 can be indirectly coupled to the rotor 130, for example, by a gear train, clutch mechanism, or other manner.

In configurations with an un-shrouded turbine wheel 120, the turbine housing assembly 108 includes an inwardly oriented shroud surface 103 that resides closely adjacent to, and at most times during operation, out of contact with the blade tips 122 of the turbine wheel 120. The close proximity of the blade tips 122 and shroud surface 103 substantially seals against passage of working fluid therebetween, as the working fluid flows through the turbine wheel 120. Although some amount of the working fluid may leak or pass between the blade tips 122 and the shroud surface 103, the leakage is insubstantial in the operation of the turbine wheel 120. In certain instances, the leakage can be commensurate with other similar unshrouded-turbine/shroud-surface interfaces, using conventional tolerances between the blade tips 122 and the shroud surface 103. The amount of leakage that is considered acceptable leakage may be predetermined. The operational parameters of the turbine generator may be optimized to reduce the leakage. The shroud surface 103 may reside at a specified distance away from the blade tips 122, and is maintained at a distance away from the blade tips 122 during operation of the generator apparatus 100 by using magnetic positioning devices, including magnetic bearings and position sensors. The shroud surface 103 may be abradable. That is, shroud surface 103 may be constructed of or otherwise coated with materials selected to abrade without substantially damaging the blade tips 122. In certain instances, the materials can be softer, or substantially softer, than the material of the blade tips 122. For example, in an instance where the turbine blade is steel, a titanium alloy, or a nickel alloy, the shroud surface 103 may be a material such as silver, polymer, bronze, or other material. The shroud surface 103 may include the abradable material in a honey-comb pattern to facilitate break-in. In other instances, the blade tips 122 can be configured to be abradable and the shroud surface 103 not. The blade tips 122 may impinge on the shroud, which may cause abrasion of either the shroud 103 (for abradable shrouds) or the blade tips 122 (for abradable blade tips). Such abrasion may improve the tolerance of the gap between the turbine wheel 120 and the shroud 103.

As shown in FIG. 1, bearings 115 and 145 are arranged to rotatably support the rotor 130 and turbine wheel 120 relative to the stator 162, and the shroud surface 103. The turbine wheel 120 is supported in a cantilevered manner by the bearings 115 and 145. In embodiments, the turbine wheel 120 may be supported in a non-cantilevered manner and bearings 115 and 145 may be located on the outlet side of turbine wheel 120. In certain instances, one or more of the bearings 115 or 145 can include ball bearings, needle bearings, magnetic bearings, foil bearings, journal bearings, or others. The bearings 115 and 145 need not be the same types of bearings. In certain instances, the bearings 115 and 145 comprise magnetic bearings. U.S. Pat. No. 6,727,617 assigned to Calnetix, Inc. describes bearings suitable for use as bearings 115 and 145. Bearing 115 may be a combination radial and thrust bearing, supporting the rotor 130 in radial and axial directions. Bearing 145 is a radial bearing, supporting the rotor 130 radially. Other configurations could be utilized.

In the embodiments in which the bearings 115 and 145 are magnetic bearings, the turbine generator apparatus 100 may include one or more backup bearings. For example, at start-up and shut-down or in the event of a power outage that affects the operation of the magnetic bearings 115 and 145, first and second backup bearings 119 and 149 may be employed to rotatably support the turbine wheel 120 during that period of time. The first and second backup bearings 119 and 149 may comprise ball bearings, needle bearings, journal bearings, or the like. In certain instances, the first backup bearing 119 includes ball bearings that are arranged near the first magnetic bearing 115. Also, the second backup bearing 149 includes ball bearings that are arranged near the second magnetic bearing 145. Thus, in certain instances, even if the first and second bearings 115 and 145 temporarily fail (e.g., due to an electric power outage or other reason), the first and second backup bearings 119 and 149 would continue to support the turbine wheel 120 and the rotor 130. In certain instances, backup bearing 119 may be a combination backup bearing, including a radial bearing and an axial bearing.

Turbine generator apparatus 100 may also include position sensors to detect the position or changes in the position of the turbine wheel 120 and rotor 130 relative to the housing assembly 108 or other reference point (such as a predetermined value). For example, turbine generator apparatus 100 may include an axial position sensor 150 that measures or determines changes in the axial position of the turbine wheel. For example, if the turbine wheel moves laterally, the axial sensor can detect changes in the lateral direction and send that information to one of the bearings, such as the combination magnetic bearing 115. The combination magnetic bearing 115 can respond to the information from the sensor 150 and adjust for the displacement. A controller 180 may receive information from the position sensor(s) 150 and process that information to provide control signals to the magnetic bearings 115, 145. Similarly, the turbine generator apparatus includes radial position sensors 152, which can detect changes in the radial position of the turbine 120 or the rotor 130, and provide information to the radial or combination bearings to make adjustments (e.g., through controller 180). Further, the use of position sensors 150, 152 and magnetic bearings 115, 145 to maintain and/or adjust the position of the wheel blades 122 such that the wheel blades 122 stay in close proximity to the shroud surface 103 permits the turbine apparatus 100 to operate without the need for seals between the working fluid inlet 102 and the working fluid outlet 101.

Figure 5:
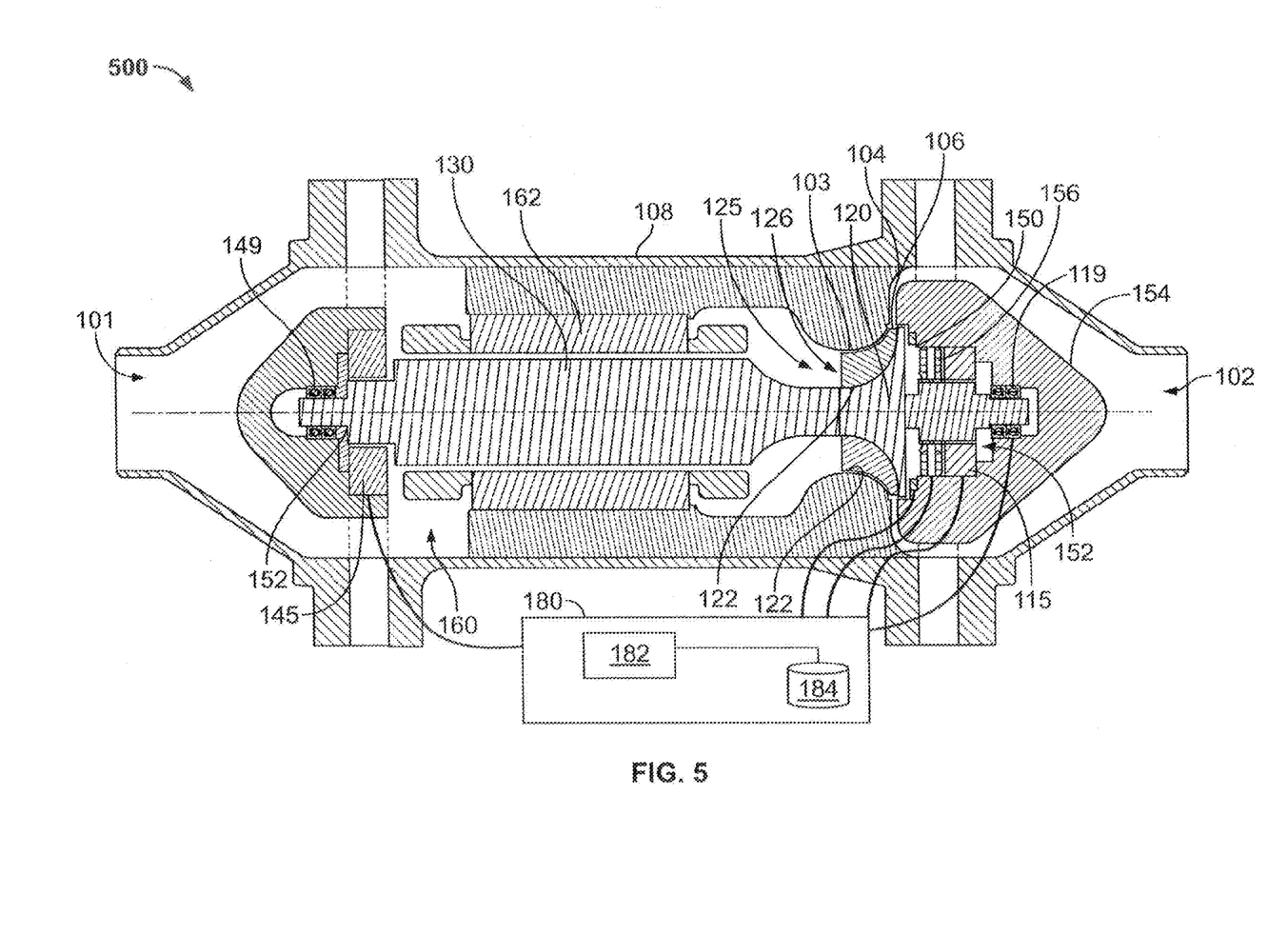
FIG. 5 is a cross-sectional view of a turbine generator apparatus with two axial position sensors in accordance with the present disclosure.

In some embodiments, the turbine generator includes an axial sensor 150 in addition to a separate sensor at the turbine wheel. For example, the turbine generator apparatus 500 shown in FIG. 5 shows the turbine generator apparatus as including a position sensor 150 proximate the wheel and an additional position sensor 156. The position sensor 156 may provide a baseline position for main magnetic bearing control, providing a baseline signal for dynamic, low resolution fluctuations in the position of the turbine wheel. Example position sensors may include those of the type described in U.S. patent application Ser. No. 12/475,052, filed May 29, 2009. The position sensor 150 may detect small or high resolution static or low frequency fluctuations in the position of the turbine wheel. For example, the position sensor 150 may generate a DC offset from the baseline signal. Such small fluctuations or displacements may be caused by thermal effects (e.g., from warm-up cycles or increasing speed of the turbine wheel) or pressure gradients from the flow of the working fluid.

In some embodiments, the controller 180 may send control signals to the magnetic bearings 115 to keep the blade tips 122 at a relatively large distance away from the shroud 103 during start-up. This distance would provide sufficient clearance for the turbine wheel 120 to begin rotating in response to working fluid flow without requiring the system to make constant changes to the position of the turbine wheel 120 relative the shroud 103 as the turbine wheel 120 temperature and rotation speed increases, both of which may result in changing pressures and pressure differentials from the inlet to the outlet of the turbine wheel 120. When the turbine wheel 120 and other components have reached operating conditions, the controller may send a control signal to the magnetic bearings 115 to move the turbine wheel 120 into position at close proximity to the shroud 103 to reduce the gap therebetween and reduce leakage.

Controller 180 may include a processor 182 and a memory 184. Although illustrated as a single processor 182 in FIG. 1, two or more processors may be used according to particular needs, desires, or particular embodiments. Processor 182 may be a central processing unit (CPU), a digital signal processor (DSP), a blade server configuration, an application specific integrated circuit (ASIC), a field-programmable gate array (FPGA), or another suitable component. Generally, the processor 182 executes instructions and manipulates data to perform the operations of controller 180. Specifically, the controller's processor 182 executes the functionality required to receive data from the position sensors 150 and 152, process that data, and provide instructions to bearings 115 and/or 145 to control and/or adjust the position of the turbine wheel relative to the shroud. Processor 182 may be a hardwired digital circuit or may be a general purpose processor implementing software algorithms. Instructions may be fully or partially written or described in any appropriate computer language including C, C++, Java, Visual Basic, assembler or assembly language, Perl, any suitable version of 4GL, as well as others.

Memory 184 may include any memory or database module and may take the form of volatile or non-volatile memory including, without limitation, magnetic media, optical media, random access memory (RAM), read-only memory (ROM), removable media, or any other suitable local or remote memory component. Memory 184 may store various objects or data, including applications, backup data, database tables, repositories storing dynamic information, and any other appropriate information including any parameters, variables, algorithms, instructions, rules, constraints, or references thereto associated with the purposes of the controller 180.

For turbine generator apparatus 100, the position sensors operate in conjunction with the magnetic bearings to maintain the position of the turbine wheel blades at a close proximity to the shroud surface 103. The bearings are configured to adjust for dynamic thrust loads that are generated by pressure differentials across the turbine wheel 120. The axial positioning of the rotor 130 and the turbine 120 may be achieved using position sensors with feedback to control the running clearances during operation. The use of such sensors may increase rotation efficiency by reducing leaks of the working fluid from the wheel.

The position of the turbine wheel 120 relative to the shroud surface 103 can be controlled by a number of different techniques. For example, the relative position of the housing and the back or body of the turbine wheel may be measured. This measurement may be used as the axial position control input. In certain embodiments, the relative position of the housing and the rotor at some general axial location (normally close to the axial bearing) may be measured, and this measurement may be used as the primary axial position control input, while using a secondary measurement may provide an axial static offset to the primary measurement for the purpose of controlling the turbine-wheel-to-shroud gap. This secondary measurement could be a measurement of the relative position of the housing and the back or body of the turbine wheel, processed to take out undesired dynamics. In embodiments, the secondary measurement could be a measurement of the relative position of the housing and the unshrouded blade tips. In other embodiments, the secondary measurement could be a measurement of one of or a combination of flow, pressure, or generator parameters that allow a desirable wheel/housing gap to be inferred, for instance, by calculating efficiency or reaching a target output power for a given set of flow or speed conditions. One or a combination of the above techniques may be implemented and would be consistent with the present disclosure. The "secondary measurements" may be, for example, the primary way of determining how to position the turbine.

Figure 7:
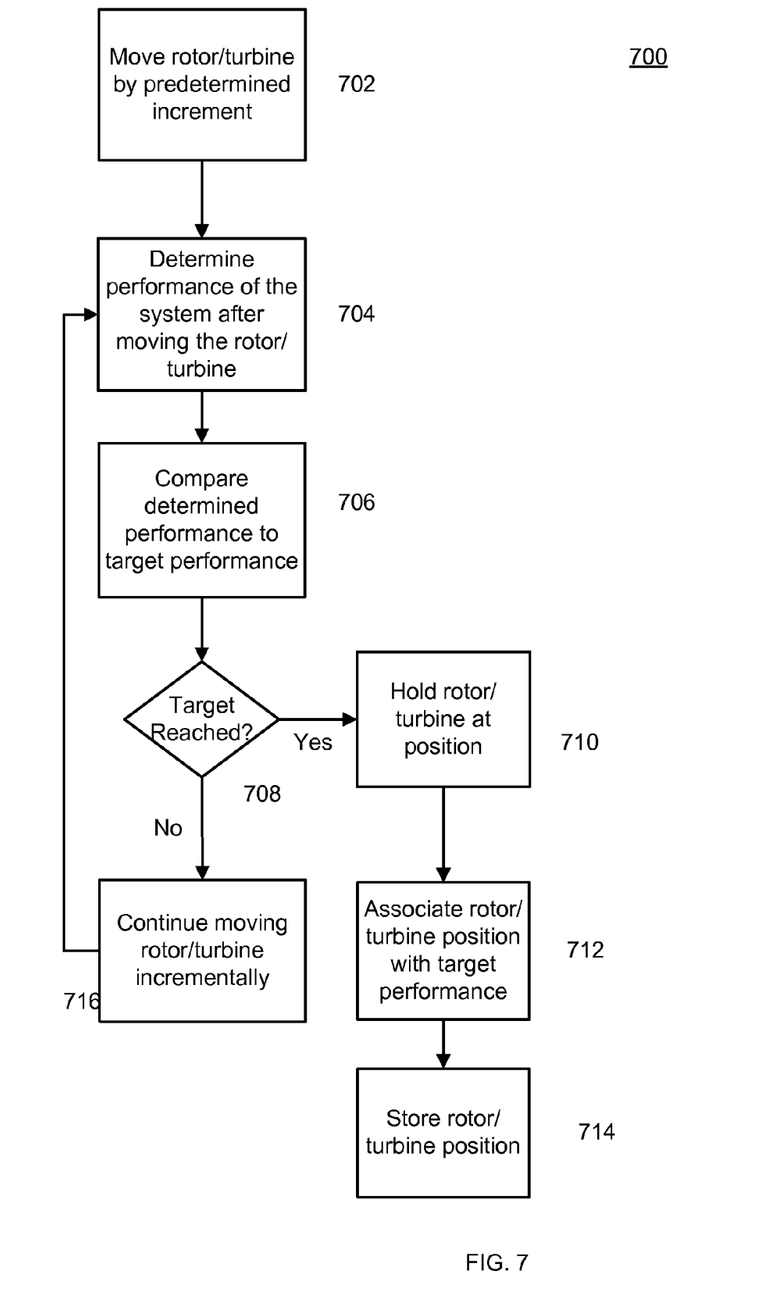
FIG. 7 is a process flow diagram illustrating an example method for positioning the rotor and/or turbine based on system efficiency metrics.

FIG. 7 is a process flow diagram illustrating an example method 700 for positioning the rotor and/or turbine based on system and/or subsystem performance. In certain instances, the performance can be analyzed in absolute terms or in terms of efficiency (i.e., measured performance vs. a target performance). In embodiments, the performance (e.g., efficiency) of the system and/or subsystem may be determined (704). In certain implementations, the rotor and/or turbine may be moved incrementally before determining the performance (702). If utilizing efficiency, the efficiency may be determined by measuring one or more performance metrics, and performing calculations or other operations based on those performance metrics to determine the efficiency. Furthermore, changes in performance may also be measured and/or calculated and used to guide the positioning of the rotor and/or turbine. The increments by which the rotor and/or turbine is moved may be predetermined to a resolution that yields the desired results and may be limited by the resolution of the position sensor and/or magnetic actuators. The increments can be equal or unequal, and in certain instances, can be determined as a function of the performance or deviation between measured and target performance. The performance may be compared to a target performance (706). If the determined performance is not at the target performance, the turbine wheel may be moved again (716), and the performance at this subsequent position may then be determined and compared with the previous performance (706). This cycle can continue until the target performance is reached (708) or the cycle can be curtailed. It is understood that the target performance may be lower than a peak operating performance (or peak efficiency). For example, in certain instances, reaching peak performance may require increasing working fluid flow rates or volumes to levels that are undesirable. Thus, a target performance may be determined, either theoretically or empirically, to optimize performance and sustainability. Once the target performance has been reached by incrementally adjusting the position of the rotor and/or turbine, the position may be maintained (710). The calibrated position may be associated with the target performance for subsequent reference (712) and stored (714). If, after incrementally adjusting the position of the rotor and/or turbine, the target efficiency has not been reached (708), the position may be incrementally adjusted again (716), the efficiency may be determined (704) and compared against the target efficiency (706).

The performance metrics may include one or several metrics used to determine the overall performance of the system or the performance of particular components of the system (e.g., the expander or other components). The metrics may include, but are not limited to, a comparison of the performance before and after the conversion of pressure to energy, the efficiency of the system, the efficiency of the expander, a comparison of the measured performance or efficiency of the turbine with its theoretical performance or efficiency, the pressure drop across the expander, the pressure ratio of pressure upstream versus downstream of the expander, the pressure and temperature associated with the expansion of the working fluid, the rotational speed of the turbine, the flow rate and volume of the working fluid, and other metrics.

Figure 8:
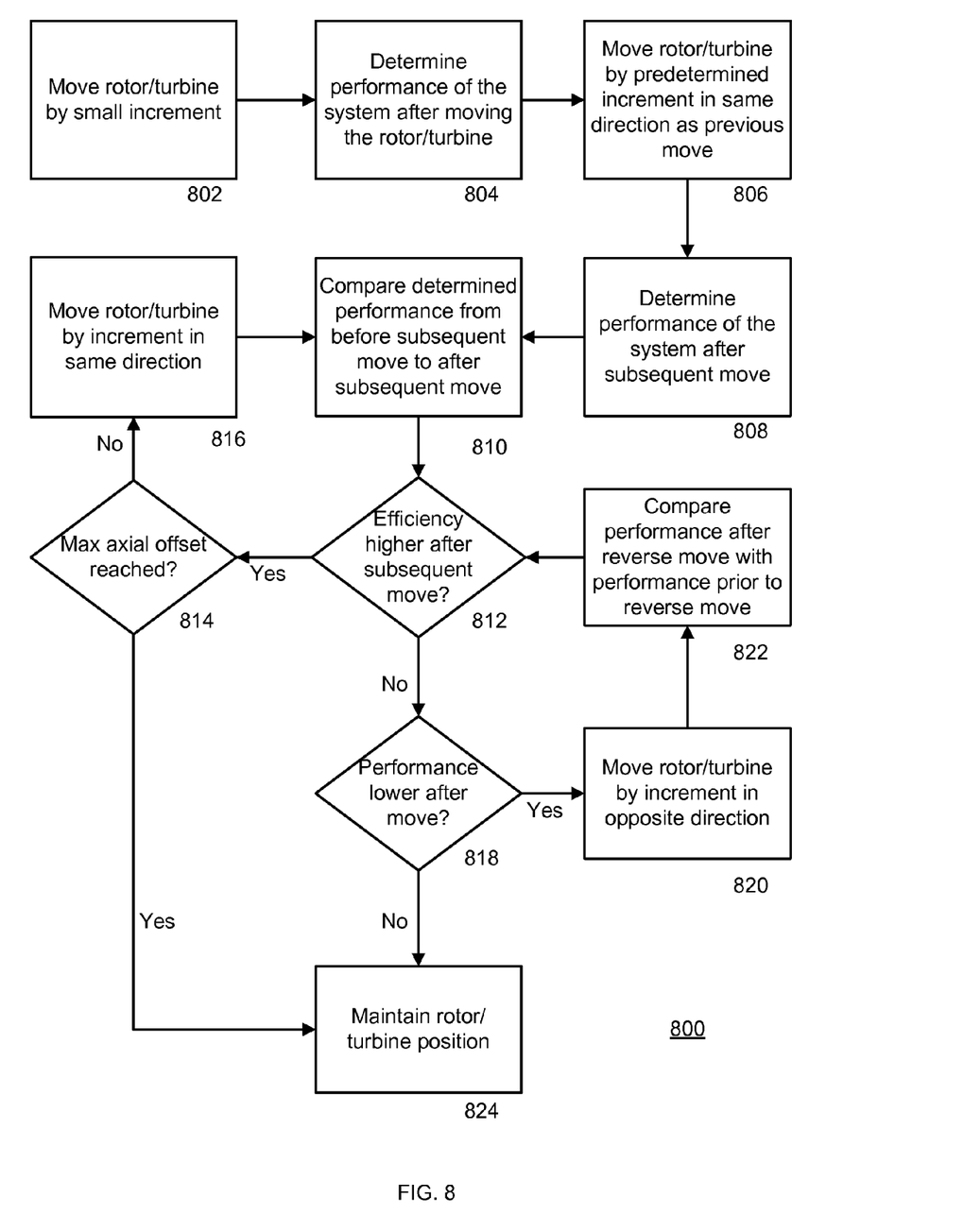
FIG. 8 is a process flow diagram illustrating an example method for positioning the rotor and/or turbine based on system efficiency metrics.

FIG. 8 is a process flow diagram illustrating an example method 800 for positioning the rotor and/or turbine based on system efficiency metrics. For example, the efficiency of a system may be determined. In certain implementations, the rotor and/or turbine may be moved incrementally before determining the efficiency of the system (802). The rotor and/or turbine may be moved by a small, predetermined increment in a specified direction. The rotor is moved (again) after initially determining system efficiency (806). If the system initialized by moving the rotor, then this second move is in the same direction as the first move. The efficiency is then determined again (808), and the efficiencies of the system before and after the subsequent moves are compared (810). If the efficiency is higher after the second positioning of the rotor (812), the system may continue to adjust the rotor position to determine whether a maximum efficiency has been reached. First, it must be determined whether a maximum axial offset has been reached (814). If it has, the position may be maintained (824). In certain implementations, the system may back off from the maximum axial offset and perform the calibration again to ensure a that a maximum efficiency has been reached. If the maximum offset has not been reached, then the rotor and/or turbine is moved again in the same direction (816). The efficiencies before and after are compared (810). If the efficiency is higher, then the cycle repeats (812-814-816-810). If the efficiency is not higher, it is determined whether the efficiency is lower than during the previous cycle (818). If it is lower, then the rotor position may be moved incrementally in the opposite direction (820). The efficiency after this opposite move is compared to the previous efficiency (822). If the efficiency is not higher than the previous move (812) and is not lower than the previous move (818), the position is maintained. The metrics used to calculate efficiencies may be recorded and the metrics, the efficiency, and the position of the rotor may be stored and associated with each other for future reference.

The system could be an adaptive system. For example, the system could respond to changes in the efficiency of the system by automatically adjusting the turbine position. As a further example, the system could respond to changes in peak efficiencies due to changes in operational parameters in other parts of the system. In certain instances, the position of the rotor and/or turbine during operation may inform the operational performance parameters. For example, if a position of the turbine were set so that leakage of the working fluid were reduced to desired levels, other system parameters may be adjusted to increase system efficiency.

The turbine generator apparatus 100 is configured to generate electricity in response to the rotation of the rotor 130. In certain instances, the rotor 130 can include one or more permanent magnets. The stator 162 includes a plurality of conductive coils. Electrical current is generated by the rotation of the magnet within the coils of the stator 162. The rotor 130 and stator 162 can be configured as a synchronous, permanent magnet, multiphase AC generator. In certain instances, stator 162 may include coils. When the rotor 130 is rotated, a voltage is induced in the stator coil. At any instant, the magnitude of the voltage induced in coils is proportional to the rate at which the magnetic field encircled by the coil is changing with time (i.e., the rate at which the magnetic field is passing the two sides of the coil). In instances where the rotor 130 is coupled to rotate at the same speed as the turbine wheel 120, the turbine generator apparatus 100 is configured to generate electricity at that speed. Such a turbine generator apparatus 100 is what is referred to as a "high speed" turbine generator.

Figure 6:
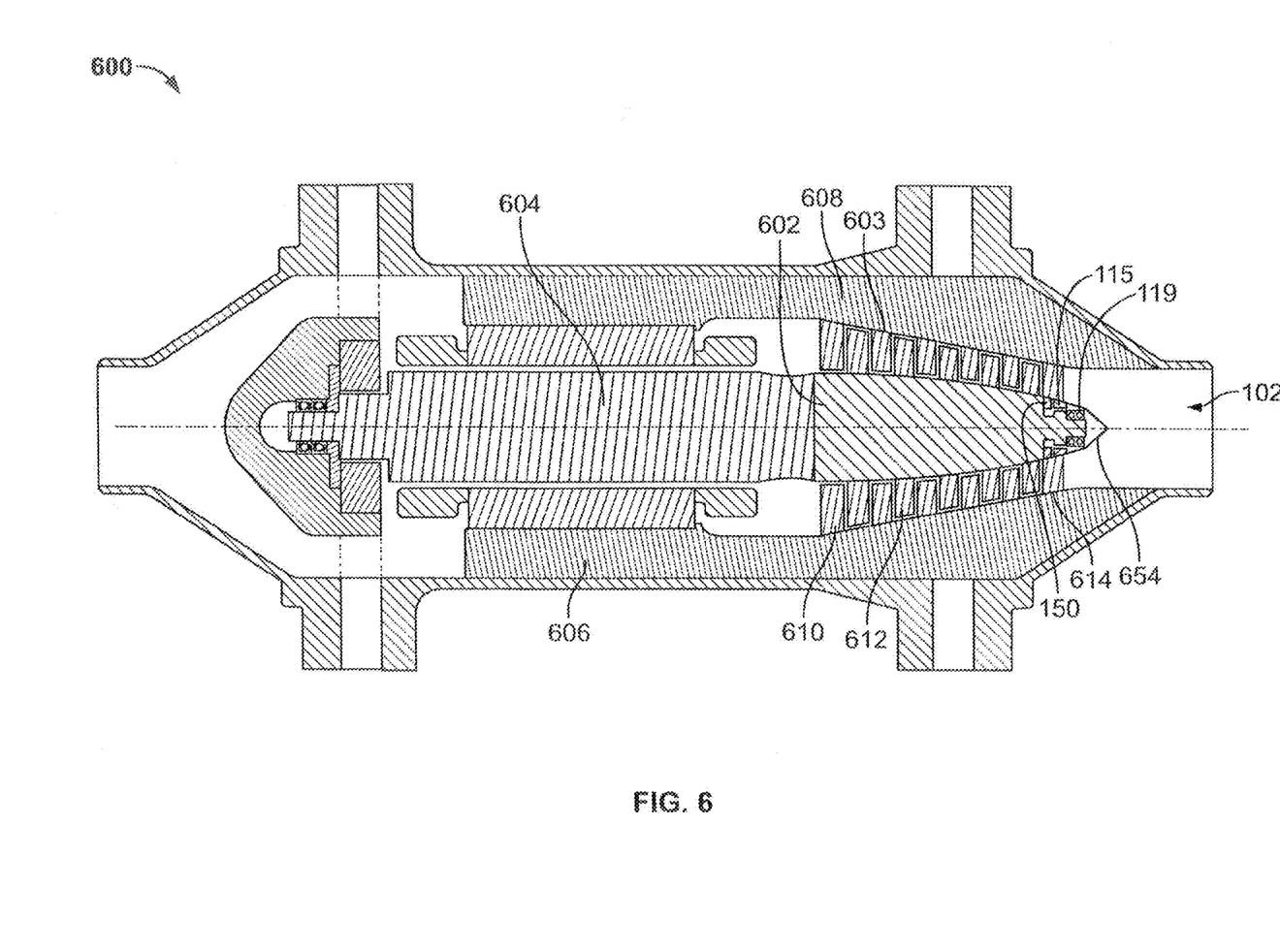
FIG. 6 is a cross-sectional view of the turbine generator apparatus with a multi-stage, axial flow turbine wheel in accordance with the present disclosure.

Different configurations of turbines can be used. For example, FIG. 6 shows turbine generator apparatus 600 with an axial flow turbine. Axial turbine 602 may include a single stage or may include multiple stages. The turbine may be shrouded or unshrouded. The turbine 602 is coupled to a rotor 604 of generator 606. As such, the turbine 602 is driven to rotate by the expansion of the working fluid, and in turn, the rotor 604 rotates in response to the rotation of the turbine 602. Turbine 602 may have one or more blades 612. Blades 612 cause turbine 602 to rotate in response to working fluid. Working fluid may be directed to the blades 612 across a flow diverter 654, which may be part of the nose cone of the turbine wheel 602. Blades 610 are affixed to the housing 608 and operate in concert with blades 612 to cause rotation of the turbine wheel 602 and expansion of the fluid. Struts 614 are also rigidly affixed to housing 608 and provide support for the turbine 602. The blades 612 reside proximate a shroud surface 603 on housing 608. Shroud surface 603 may be made of an abradable material. In certain instances, the blades 612 may contact the shroud surface, 603 causing the shroud surface 603 to abrade, which may create a better seal between the blades 612 and the shroud surface 603. In certain instances, the turbine generator may be a variable turbine responsive to hydraulic axial thrust mechanisms, which may have at least two positions. Turbine generator apparatus 600 may include a position sensor 150 to measure the position of the turbine. Bearings 115 may respond to the position information from position sensor 150 to maintain the position of the turbine 602 relative the shroud surface 603. Backup bearings 119 may provide additional bearing support.

Figure 2:
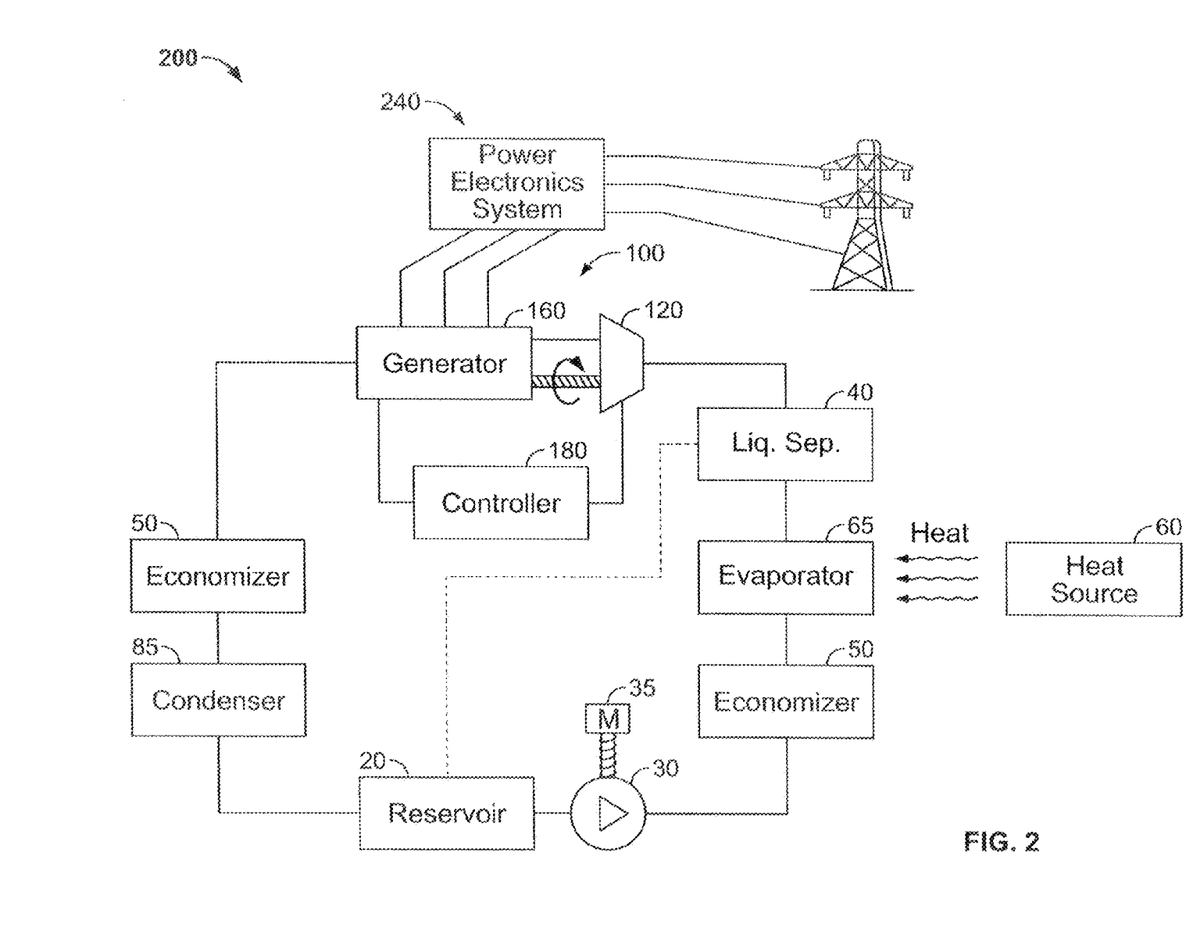
FIG. 2 is a schematic of an electrical power generation system incorporating a turbine generator apparatus, in accordance with the present disclosure.

Referring now to FIG. 2, embodiments of the turbine generator apparatus 100 can be used in a Rankine cycle 200 that recovers waste heat from one or more industrial processes. For example, the Rankine cycle 200 may comprise an organic Rankine cycle that employs an engineered working fluid to receive waste heat from a separate process. In certain instances, the working fluid may be a refrigerant (e.g., an HFC, CFC, HCFC, ammonia, water, or other refrigerant), such as, for example, R245fa. As such, the turbine generator apparatus 100 can be used to recover waste heat from industrial applications and then to convert the recovered waste heat into electrical energy. Furthermore, the heat energy can be recovered from geo-thermal heat sources and solar heat sources. In some circumstances, the working fluid in such a Rankine cycle 200 may comprise a high molecular mass organic fluid that is selected to efficiently receive heat from relatively low temperature heat sources. Although the turbine generator apparatus 100 and other components are depicted in the Rankine cycle 200, it should be understood from the description herein that some components that control or direct fluid flow are excluded from view in FIG. 2 merely for illustrative purposes.

In certain instances, the turbine generator apparatus 100 can be used to convert heat energy from a heat source into kinetic energy (e.g., rotation of the rotor), which is then converted into electrical energy. For example, the turbine generator apparatus 100 may output electrical power that is configured by a power electronics package to be in form of 3-phase 60 Hz power at a voltage of about 400 VAC to about 480 VAC. Alternative embodiments may output electrical power having other selected settings. In certain instances, the turbine generator apparatus 100 may be configured to provide an electrical power output of about 2 MW or less, about 50 kW to about 1 MW, and about 100 kW to about 300 kW, depending upon the heat source in the cycle and other such factors. Again, alternative embodiments may provide electrical power at other power outputs. Such electrical power can be transferred to a power electronics system and, in certain instances, to an electrical power grid system.

The Rankine cycle 200 may include a pump device 30 that pumps the working fluid. The pump device 30 may be coupled to a liquid reservoir 20 that contains the working fluid, and a pump motor 35 can be used to operate the pump. The pump device 30 may be used to convey the working fluid to an evaporator heat exchanger 65 of the Rankine cycle 200. Evaporator heat exchanger 65 may receive heat from a heat source 60. As shown in FIG. 2, the heat source 60 may include heat that is recovered from a separate process (e.g., an industrial process in which heat is byproduct). Some examples of heat source 60 include commercial exhaust oxidizers (e.g., a fan-induced draft heat source bypass system, a boiler system, or the like), refinery systems that produce heat, foundry systems, smelter systems, landfill flare gas and generator exhaust, commercial compressor systems, solar heaters, food bakeries, geo-thermal sources, solar thermal sources, and food or beverage production systems. In such circumstances, the working fluid may be directly heated by the separate process or may be heated in a heat exchanger in which the working fluid receives heat from a byproduct fluid of the process. In certain instances, the working fluid can cycle through the heat source 60 so that all or a substantial portion of the fluid is converted into gaseous state. Accordingly, the working fluid is heated by the heat source 60.

Typically, working fluid at a low temperature and high pressure liquid phase from the pump 30 is circulated into one side of the economizer 50 while working fluid at a high temperature and low pressure vapor phase is circulated into another side of the economizer 50 with the two sides being thermally coupled to facilitate heat transfer therebetween. Although illustrated as separate components, the economizer 50 may be any type of heat exchange device, such as, for example, a plate and frame heat exchanger or a shell and tube heat exchanger or other device.

The evaporator heat exchanger 65 may also be a plate and frame heat exchanger. The evaporator may receive the working fluid from the economizer 50 at one side and receive a supply thermal fluid at another side, with the two sides of the evaporator heat exchanger 65 being thermally coupled to facilitate heat exchange between the thermal fluid and working fluid. For instance, the working fluid enters the evaporator heat exchanger 65 from the economizer 50 in liquid phase and is changed to a vapor phase by heat exchange with the thermal fluid supply. The evaporator heat exchanger 65 may be any type of heat exchange device, such as, for example, a shell and tube heat exchanger or other device.

Liquid separator 40 may be arranged upstream of the turbine generator apparatus 100 so as to separate and remove a substantial portion of any liquid state droplets or slugs of working fluid that might otherwise pass into the turbine generator apparatus 100. Accordingly, in certain instances of the embodiments, the gaseous state working fluid can be passed to the turbine generator apparatus 100, while a substantial portion of any liquid-state droplets or slugs are removed and returned to the reservoir 20. In certain instances of the embodiments, a liquid separator may be located between turbine stages (e.g., between the first turbine wheel and the second turbine wheel) to remove liquid state droplets or slugs that may form from the expansion of the working fluid from the first turbine stage. This liquid separator may be in addition to the liquid separator located upstream of the turbine apparatus.

Referring briefly to FIGS. 1 and 2, after passing through the liquid separator 40, the heated and pressurized working fluid may pass through the inlet conduit 104 and toward the turbine wheel 120 and may pass through the turbine inlet 106. The working fluid expands as it flows across the turbine wheel 120, thereby acting upon the turbine wheel 120 and causing rotation of the turbine wheel 120. Accordingly, the turbine generator apparatus 100 can be included in a fluid expansion system in which kinetic energy is generated from expansion of the working fluid. The rotation of the turbine wheel 120 is translated to the rotor 130 which, in certain instances, includes a magnet that rotates within an electrical generator device 160. As such, the kinetic energy of the turbine wheel 120 is used to generate electrical energy. The electrical energy output from the electrical generator device 160 can be transmitted via one or more connectors (e.g., three connectors may be employed in certain instances). As mentioned above in connection to FIG. 2, in certain instances, the working fluid may be directed through the generator 160 and output to the economizer 50. In some instances, such as that illustrated in FIG. 1, the working fluid may expand as it passes through turbine wheel 120 causing turbine wheel 120 to rotate before it enters the generator 160. For example, the working fluid may pass through a gap between the rotor 130 and the stator 162 within the generator housing assembly 108. The working fluid may cool the generator 160 (or in FIG. 3A, generator 397). Control electronics 180 communicates with the magnetic bearings and the position sensors, if any, to control the position of the turbine 120 and/or rotor 130 relative to the housing 108.

Referring to FIG. 2, in certain instances, the electrical energy can be communicated via the connectors to a power electronics system 240 that is capable of modifying the electrical energy. In one example, the power electronics system 240 may be connected to an electrical power grid system. As previously described, in certain instances, the turbine generator apparatus 100 may be configured to provide an electrical power output of about 2 MW or less, about 50 kW to about 1 MW, and about 100 kW to about 300 kW, depending upon the heat source 60, the expansion capabilities of the working fluid, and other such factors. In certain instances, the electrical energy output by the turbine generator apparatus 100 can be supplied directly to an electrically powered facility or machine.

In certain instances of the Rankine cycle 200, the working fluid may flow from the outlet conduit 125 of the turbine generator apparatus 100 to a condenser heat exchanger 85. The condenser heat exchanger 85 is used to remove heat from the working fluid so that all or a substantial portion of the working fluid is converted to a liquid state. In certain instances, a forced cooling airflow or water flow is provided over the working fluid or the condenser heat exchanger 85 to facilitate heat removal. After the working fluid exits the condenser heat exchanger 85, the fluid may return to the liquid reservoir 20 where it is prepared to flow again though the cycle 200. In certain instances, the working fluid exits the generator 160 (or in some instances, exits a turbine wheel) and enters the economizer heat exchanger 50 before entering the condenser 85, as described above.

In some embodiments, the working fluid returned from the condenser heat exchanger 85 enters the reservoir 20 and is then pressurized by the pump 30. The working fluid is then circulated to the cold side of the economizer 50, where heat therefrom is transferred to the working fluid (e.g., from the hot side to the cold side of the economizer 50). Working fluid exits the cold side of the economizer 50 in liquid phase and is circulated to an evaporator (not shown), thereby completing or substantially completing the thermodynamic cycle.

Figure 3A:
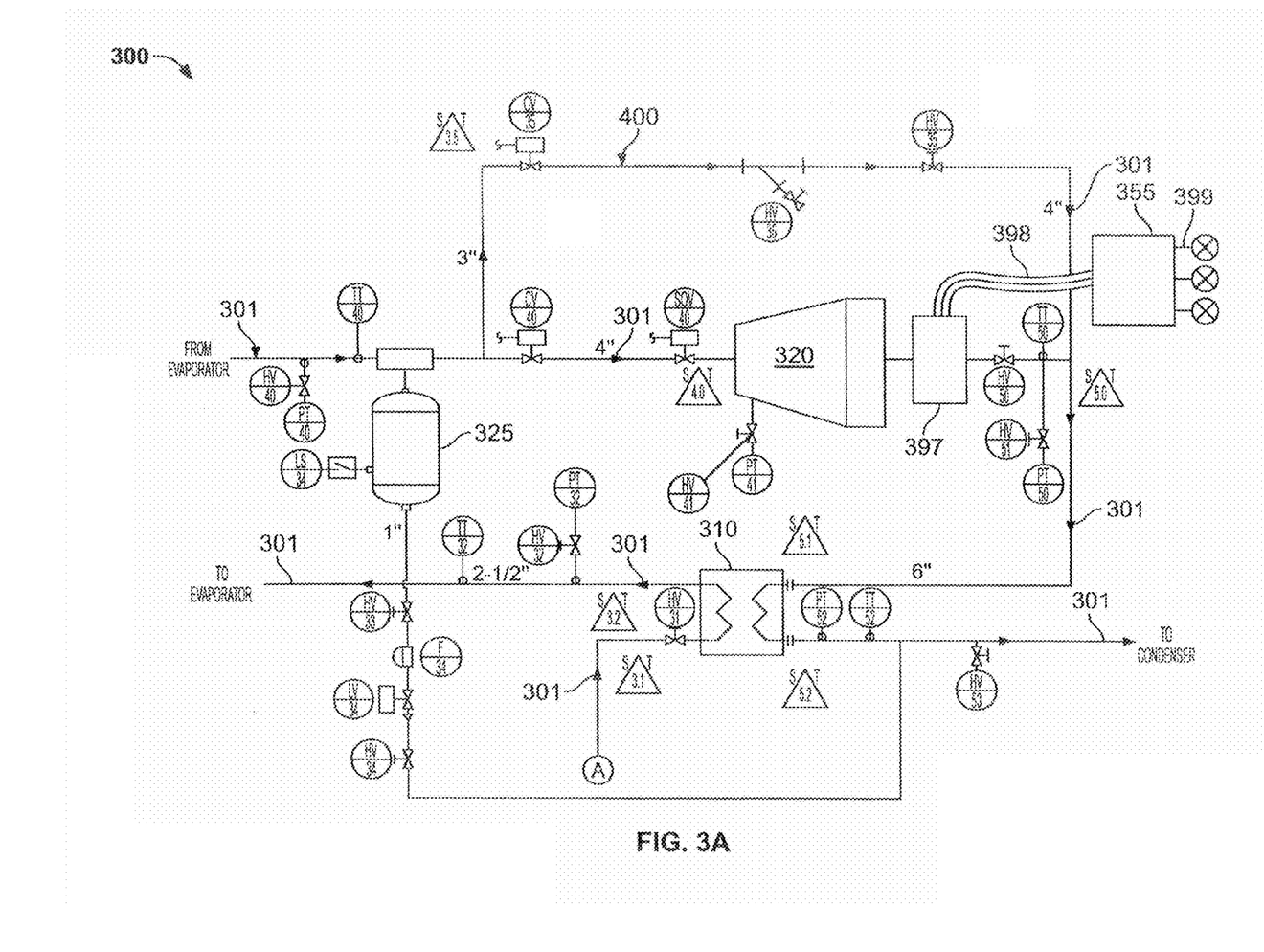
FIG. 3A is a schematic of a closed loop cycle incorporating a turbine generator apparatus in accordance with the present disclosure.
Figure 3B:
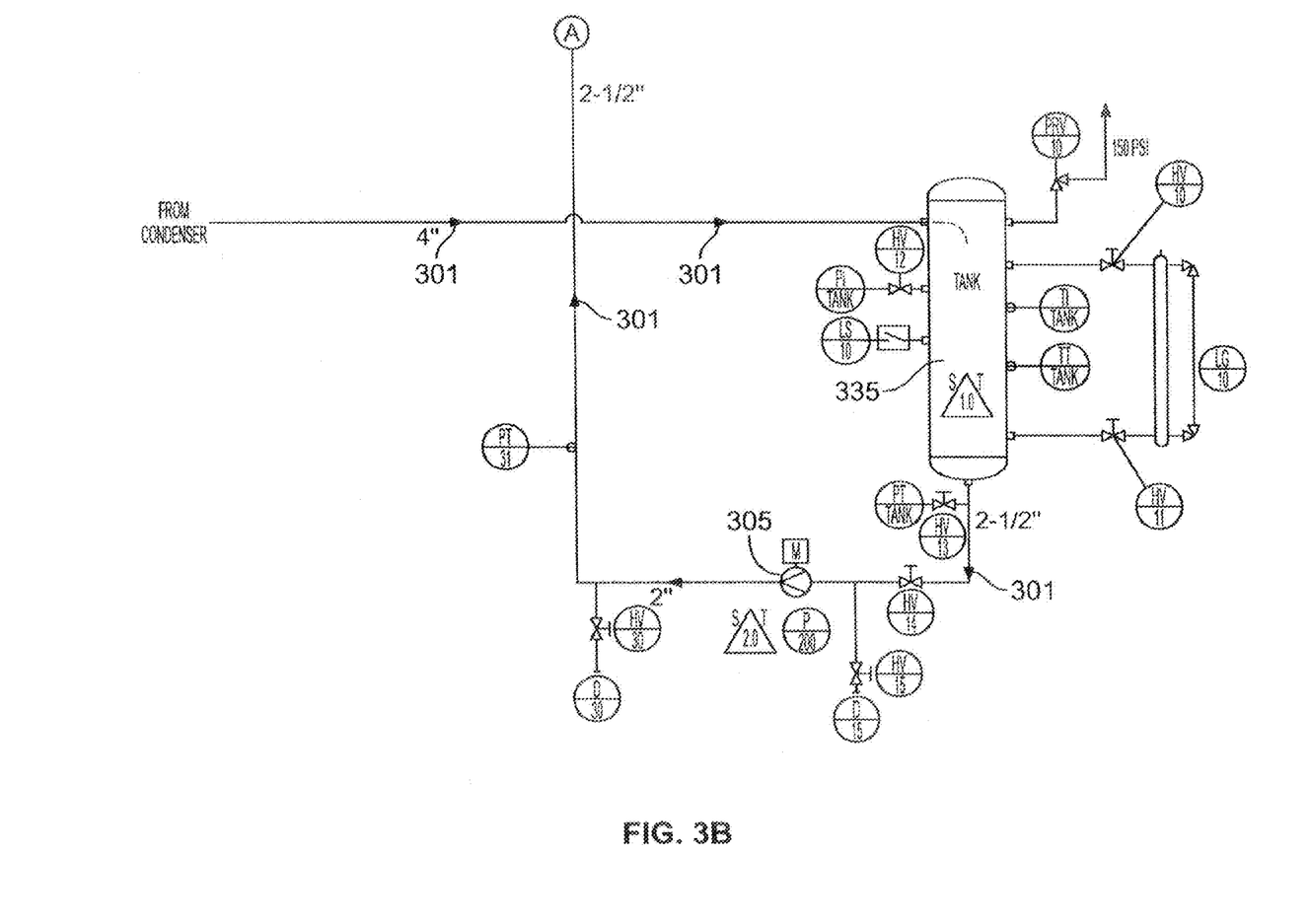
FIG. 3B is a continuation of the schematic of FIG. 3A showing a closed loop cycle incorporating a turbine generator apparatus in accordance with the present disclosure.

FIGS. 3A-B illustrate an example process diagram showing one example of a power generation system 300. FIG. 3A continues onto FIG. 3B, where point (A) of FIG. 3A connects to point (A) of FIG. 3B. As illustrated, the process diagram of FIGS. 3A-B may include more detail and show more components (e.g., sensors such as temperature and pressure sensors or transducers ("PT" and "TT"); valves such as control valves ("CV"), solenoid operated valves ("SOV") and hand valves ("HV"); fittings; or other components) as compared to FIG. 2. Although some components of power generation system 300 are shown as single components, the present disclosure contemplates that each single component may be multiple components performing identical or substantially identical functions (e.g., reference to economizer 310 encompasses references to multiple economizers). Likewise, although some components of power generation system 300 are shown as multiple components, the present disclosure contemplates that multiple, identical components may be a single component performing the identical or substantially identical functions as the multiple components (e.g., reference to turbine expander 320 encompasses reference to a single turbine expander 320).

Power generation system 300 includes a working fluid pump 305, an economizer 310, a first turbine expander 320 coupled to a generator 397, a receiver 335, and power electronics 355. A working fluid 301 circulates through the components of power generation system 300 in a thermodynamic cycle (e.g., a closed Rankine cycle) to drive the turbine expander 320 and generate AC power 398 by the generator 397. The power generation system 300 may utilize a thermal fluid (e.g., a fluid heated by waste heat, a fluid heated by generated heat, or any other heated fluid) to drive one or more turbine expanders by utilizing a closed (or open) thermodynamic cycle to generate electrical power. In some embodiments, each turbine expander 320 may capable of rotating at rotational speeds up to 26,500 rpm or higher to drive a generator (as a component of or electrically coupled to the turbine expander 320) producing up to 125 kW or higher AC power. AC power 399 may be at a lower frequency, a higher or lower voltage, or both a lower frequency and higher or lower voltage relative to AC power 398. For instance, AC power 399 may be suitable for supplying to a grid operating at 60 Hz and between 400-480V.

In operation, power generation system 300 circulates a working fluid 301 through the turbine expander 320 to drive (i.e., rotate) the turbine expander 320. Turbine expander 320 drives the generator 397, which generates AC power 398. The generator 397 may output the working fluid 301 to the closed system or may output the working fluid 301 to a second turbine generator. The working fluid 301 exhausts from the turbine expander 320 and, typically, is in vapor phase at a relatively lower temperature and pressure. In some embodiments, the working fluid may be directed through turbine expander 320, which both output the working fluid 301 to generator 397. The working fluid 301 exhausts from the generator and continues through the cycle.

The economizer 310, as illustrated, is a plate and frame heat exchanger that is fluidly coupled with the outlet of the pump 305 and an inlet of the condenser. Typically, working fluid 301 at a low temperature and high pressure liquid phase from the pump 305 is circulated into one side of the economizer 310 while working fluid 301 at a high temperature and low pressure vapor phase (from an exhaust header) is circulated into another side of the economizer 310 with the two sides being thermally coupled to facilitate heat transfer therebetween. Although illustrated as a plate and frame heat exchanger, the economizer 310 may be any other type of heat exchange device, such as, for example, a shell and tube heat exchanger or other device.

The evaporator (not shown) may also be a plate and frame heat exchanger. The evaporator heat exchanger may receive the working fluid 301 from the economizer 310 at one side and receive a supply thermal fluid at another side, with the two sides of the evaporator heat exchanger being thermally coupled to facilitate heat exchange between the thermal fluid and working fluid 301. For instance, the working fluid 301 enters the evaporator heat exchanger from the economizer 310 in liquid phase and is changed to a vapor phase by heat exchange with the thermal fluid supply. The evaporator heat exchanger may be any type of heat exchange device, such as, for example, a shell and tube heat exchanger or other device.

Liquid separator 325 may be arranged upstream of the turbine 320 so as to separate and remove a substantial portion of any liquid-state droplets or slugs of working fluid that might otherwise pass into the turbine 320. Accordingly, the gaseous state working fluid can be passed to the turbine 320, while a substantial portion of any liquid-state droplets or slugs are removed and returned to the receiver 335 via the condenser heat exchanger.

Working fluid 301 enters the economizer 310 at both sides of the economizer 310 (i.e., the hot and cold sides), where heat energy is transferred from the hot side working fluid 301 (i.e., vapor phase) to the cold side working fluid 301 (i.e., liquid phase). The working fluid 301 exits the hot side of the economizer 310 to a condenser heat exchanger (not shown) as vapor. The working fluid 301 returns from the condenser heat exchanger in liquid phase, having undergone a phase change from vapor to liquid in the condenser by, for example, convective heat transfer with a cooling medium (e.g., air, water, or other gas or liquid).

The working fluid 301 returned from the condenser enters the receiver 335 and is then pressurized by the pump 305. The working fluid 301 is then circulated to the cold side of the economizer 310, where heat therefrom is transferred to the working fluid 301 (e.g., from the hot side to the cold side of the economizer 310). Working fluid 301 exits the cold side of the economizer 310 in liquid phase and is circulated to an evaporator (not shown), thereby completing or substantially completing the thermodynamic cycle.

In the illustrated embodiment, the power generation system 300 includes a bypass 400, which allows vapor working fluid 301 to bypass the turbine expander 320 and merge into an exhaust of the turbine expander 320. In some embodiments, this may allow for better and/or more exact control of the power generation system 300 and, more particularly, for example, to maintain an optimum speed of the turbine expander 320. In addition, the bypass permits system cleaning and emergency disconnect capabilities.

Even though the turbine generator apparatus of the present disclosure has been discussed in the context of a closed cycle, such as a Rankine cycle, it is to be understood that the turbine generator apparatus may be used in other applications. For example, the turbine generator apparatus may be used in open expansion systems. In some instances, such open expansion systems may release high pressure industrial gas to the atmosphere. In addition, the turbine generator apparatus may be used in gas let-down systems, such as natural gas distribution systems that let high pressure transmission pipeline gas down to useable consumer pressures. In other instances, the turbine generator apparatus may be used in bottoming cycles for steam and industrial processes that release low-point pressure from closed systems. The turbine generator apparatus may also be used in generator/motor assist turbochargers, steam Rankine cycles (i.e., non-organic Rankine cycles), heat engine Carnot cycles, large refrigeration/chiller Carnot systems, and mechanical air-pump generators (such as wave/tidal generators). The aforementioned list is meant to provide example applications, and the present disclosure is in no way limited to those applications recited here.

Figure 4:
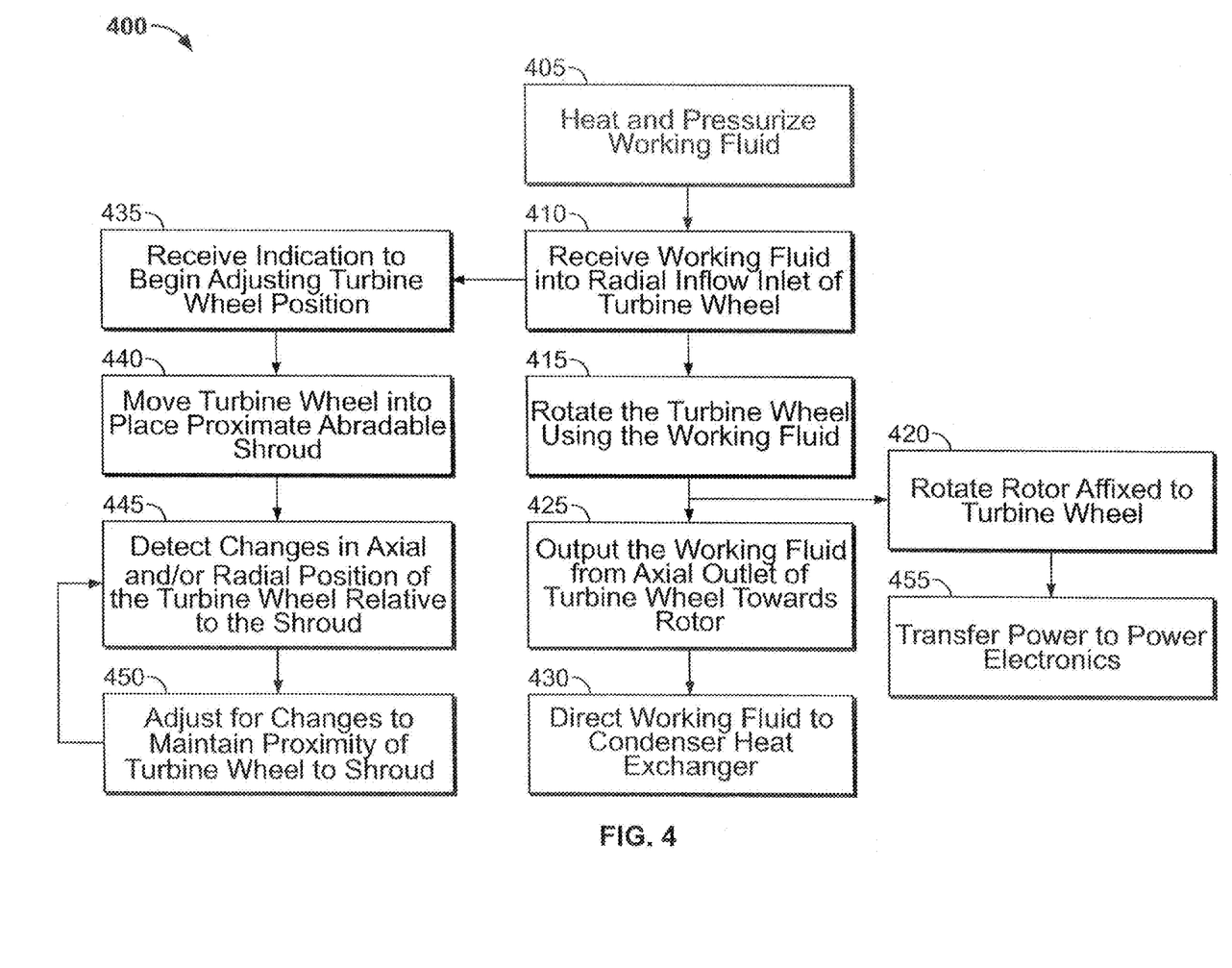
FIG. 4 is a process flow diagram showing one example operation of a turbine generator consistent with the present disclosure.

FIG. 4 is a process flow diagram showing steps to generate electrical energy from the turbine generator apparatus of the present disclosure. Steps of process flow diagram 400 are shown in a certain order, but it is to be understood by those of skill in the art that the order of the steps may be changed or added to without deviating from the scope of the disclosure. A working fluid is directed from a reservoir by a pump to an evaporator heat exchanger (405). The evaporator heat exchanger may receive heat from a heat source, such as an industrial application. In certain instances, the working fluid may be directed to the heat source without going through the heat exchanger. Heated and pressurized working fluid is directed to a turbine generator apparatus (410). In certain instances, the working fluid is directed to a radial inflow turbine wheel. The working fluid may enter the turbine wheel radially, expanding as it passes through the turbine wheel, and exits the turbine wheel axially. Other turbine wheel configurations may also be used. As the working fluid passes through or across the turbine wheel, the turbine wheel rotates (415). In certain instances, the turbine wheel is affixed to a rotor of a generator device, which rotates with the turbine wheel (420). The rotor may be directly connected to the turbine wheel by a common shaft, and may rotate at the same speed as the turbine wheel. In embodiments, the rotor and the turbine wheel may be magnetically coupled. In certain instances, the working fluid enters the turbine wheel proximate an inlet side and is output from the turbine wheel towards the generator device (425). In certain embodiments, the working fluid is directed through the generator device, for example, to cool the rotor and other components. As the working fluid expands, a pressure differential is created across the turbine wheel. The pressure may create dynamic thrust loads on the turbine wheel, changing the position of the turbine wheel relative to the housing assembly and the shroud. The working fluid may be directed from the outlet of the turbine wheel to a condenser heat exchanger (430). Rotation of the rotor may be used to generate power, which is transferred to power electronics (455), which can modify and control the power output to a grid.

On start-up, the magnetic bearings may support the turbine wheel (and in some instances, the rotor) at a relatively large distance away from the abradable shroud. This permits the turbine wheel to start rotating until the system reaches an operational speed and operational temperature. At that point, the control electronics can receive an indication to begin detecting changes in the turbine wheel position relative the shroud (435). The control electronics may send a control signal to the magnetic bearings to move the turbine wheel into position proximate the shroud (440). Position sensors can provide proximity information to the controller to optimize the position of the turbine wheel relative the shroud to substantially seal the turbine wheel from leakage of the working fluid during operation. The position sensors may detect changes in the position of the turbine (445). Changes in the position of the sensor are compensated for by magnetic bearings (450), which may receive control signals from a controller. Such bearings include magnetic thrust bearings, magnetic radial bearings, or combination magnetic bearings. The turbine wheel position can be adjusted based on sensor information, which may operate using a feedback system. The close proximity of the turbine wheel to the housing assembly shroud permits the system to operate without the need for seals. The magnetic bearings provide speedy adjustments with high precision to maintain the position of the turbine wheel relative the shroud, which establishes the pressure ratio of the turbine wheel.

A number of embodiments of the disclosure have been described. Nevertheless, it will be understood that various modifications may be made without departing from the spirit and scope of the disclosure. Accordingly, other embodiments are within the scope of the following claims.

What is claimed is:
1. An apparatus comprising:
a rotating assembly comprising:
a turbine configured to receive a working fluid and rotate in response to expansion of the working fluid flowing into an inlet of the turbine and out of an outlet of the turbine, and
a rotor of an electric generator, the rotor coupled to the turbine to rotate at the same speed as the turbine when the turbine rotates;
a stationary assembly comprising:
a stator of the electric generator, and
a housing assembly comprising a working fluid inlet and a working fluid outlet, the turbine and the stator residing in the housing assembly between the working fluid inlet and the working fluid outlet, the housing assembly defining a shroud surface adjacent the turbine; and
a plurality of bearings operable to support the rotor and turbine to rotate relative to the stator, and the plurality of bearings residing in the housing assembly between the working fluid inlet and the working fluid outlet, the rotating assembly configured having no seals between the working fluid inlet and the working fluid outlet.

2. The apparatus of claim 1, wherein the plurality of bearings comprises a plurality of magnetic bearings operable to radially support the rotor and turbine to rotate relative to the stator.

3. The apparatus of claim 1, wherein the turbine comprises a plurality of blades, each with a blade tip spanning between the inlet and the outlet of the turbine; and
wherein the housing assembly comprises an inwardly facing shroud surface, the blade tips residing at a position adjacent the inwardly facing shroud surface and substantially sealing against passage of working fluid between the blade tips and the shroud.

4. The apparatus of claim 3, wherein the plurality of bearings comprises an axial magnetic bearing actuable to control an axial position of the turbine relative the inwardly facing shroud.

5. The apparatus of claim 4, further comprising:
an axial position sensor configured to sense the axial position of the turbine relative to the housing assembly; and
a controller coupled to the axial position sensor and the axial magnetic bearing and configured to control the position of the turbine relative to the shroud surface based on data from the axial position sensor.

6. The apparatus of claim 3, wherein the shroud surface is softer than the blade tips.

7. The apparatus of claim 1 wherein the inlet to the turbine is a radial inlet and the outlet to the turbine is an axial outlet.

8. A system comprising:
a turbine generator apparatus, the turbine generator apparatus comprising:
a rotating assembly comprising:
a turbine configured to receive a working fluid and rotate in response to expansion of the working fluid flowing into an inlet of the turbine and out of an outlet of the turbine, and
a rotor of an electric generator, the rotor coupled to the turbine to rotate at the same speed as the turbine when the turbine rotates;
a stationary assembly comprising:
a stator of the electric generator, and
a housing assembly comprising a working fluid inlet and a working fluid outlet, the turbine and the stator residing in the housing assembly between the working fluid inlet and the working fluid outlet, the housing assembly defining a shroud surface adjacent the turbine, and
a plurality of bearings operable to support the rotor and turbine to rotate relative to the stator, and the plurality of bearings residing in the housing assembly between the working fluid inlet and the working fluid outlet, the rotating assembly configured having no seals between the working fluid inlet and the working fluid outlet; and
a controller coupled to the plurality of bearings and configured to control a position of the turbine relative to the shroud surface.

9. The system of claim 8, wherein the plurality of bearings comprises a plurality of magnetic bearings operable to radially support the rotor and turbine to rotate relative to the stator.

10. The system of claim 8, wherein the turbine comprises a plurality of blades, each with a blade tip spanning between the inlet and the outlet of the turbine; and
wherein the housing assembly comprises an inwardly facing shroud surface, the blade tips residing at a position adjacent the inwardly facing shroud surface and substantially sealing against passage of working fluid between the blade tips and the shroud.

11. The system of claim 10, wherein the plurality of bearings comprises an axial magnetic bearing actuable to control an axial position of the turbine relative the inwardly facing shroud.

12. The system of claim 11, further comprising:
an axial position sensor configured to sense the axial position of the turbine relative to the housing assembly; and
wherein the controller is coupled to the axial position sensor and the axial magnetic bearing and configured to control the position of the turbine relative to the shroud surface based on data from the axial position sensor.

13. The system of claim 10, wherein the shroud surface is softer than the blade tips.

14. The system of claim 8, wherein the controller is operable to:
receive one or more performance metrics pertaining to performance of the system or a subsystem thereof; and
adjust the position of the turbine relative to the shroud surface based on the performance.

15. The system of claim 14, wherein the controller is operable to determine efficiency from the received one or more performance metrics and control the position of the turbine relative to the shroud surface based on determined efficiency.

16. A method comprising:
directing a pressurized working fluid to an inlet of a housing of a turbine generator apparatus;
directing the working fluid to flow through a turbine of the turbine generator apparatus from an inlet of the turbine to an outlet of the turbine, the turbine rotating in response to the flow of the working fluid from the inlet of the turbine to the outlet of the turbine;
receiving position information from a position sensor, the position information providing a distance separating the turbine from a shroud surface on the housing;
processing the position information to determine a distance separating the turbine from the housing; and
providing instructions to one or more magnetic bearings to support the turbine to rotate relative the shroud and at a distance from the shroud to substantially seal the working fluid as it flows through the turbine.

17. The method of claim 16, wherein the turbine is coupled to a rotor configured to rotate at the same speed as the turbine.

18. The method of claim 16, wherein the one or more bearings comprises a plurality of magnetic bearings operable to radially support a rotor and turbine to rotate relative to a stator.

19. The method of claim 18, wherein the turbine comprises a plurality of blades, each with a blade tip spanning between a radial inlet and an axial outlet of the turbine; and
wherein the shroud surface is an inwardly facing shroud surface and one or more bearings support the blade tips at a position adjacent the inwardly facing shroud surface to substantially seal against passage of working fluid between the blade tips and the shroud.

20. The method of claim 19, wherein the plurality of bearings comprises an axial magnetic bearing actuable to control an axial position of the turbine relative the inwardly facing shroud.

21. The method of claim 20, wherein receiving position information from a position sensor comprises receiving an axial position of the turbine relative to the housing assembly; and
wherein the controller is coupled to the position sensor and the axial magnetic bearing and configured to control the position of the turbine relative to the shroud surface based on the axial position from the position sensor.

22. The method of claim 19, wherein the shroud surface is softer than the blade tips.

* * * * *